(12) United States Patent
Wang et al.

(10) Patent No.: US 7,239,772 B2
(45) Date of Patent: Jul. 3, 2007

(54) FLEXIBLE WAVEBAND AGGREGATOR AND DEAGGREGATOR AND HIERARCHICAL HYBRID OPTICAL CROSS-CONNECT SYSTEM

(75) Inventors: Ting Wang, Princeton, NJ (US); Philip Nan Ji, Princeton, NJ (US); Lane Zong, Plainsboro, NJ (US); Osamu Matsuda, Chiba (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 37 days.

(21) Appl. No.: 11/095,220

(22) Filed: Mar. 31, 2005

(65) Prior Publication Data
US 2005/0281504 A1    Dec. 22, 2005

Related U.S. Application Data

(60) Provisional application No. 60/581,278, filed on Jun. 18, 2004.

(51) Int. Cl.
*H04J 14/00* (2006.01)
*H04J 14/02* (2006.01)

(52) U.S. Cl. ............................. 385/17; 398/48; 398/49; 398/85; 385/24

(58) Field of Classification Search .................. 385/17
See application file for complete search history.

(56) References Cited

U.S. PATENT DOCUMENTS 4,861,136 A    8/1989  Stone et al.
5,715,075 A *  2/1998  Tanaka et al. ................. 398/48
5,748,349 A    5/1998  Mizrahi
5,974,207 A   10/1999  Aksyuk et al.
6,674,937 B1 * 1/2004  Blair et al. .................... 385/24
6,922,529 B2 * 7/2005  Bortz et al. ..................... 398/5
2002/0186434 A1  12/2002  Roorda et al.
2003/0185565 A1 * 10/2003  Wang et al. .................. 398/49

OTHER PUBLICATIONS

Borella, M.S. et al., "Optical Components for WDM Lightwave Networks", Proceedings of the IEEE, vol. 85, No. 8, Aug. 1997.
Elmirghani, J.M.H. et al., "Technologies and Architectures for Scalable Dynamic Dense WDM Networks", IEEE Communication Magazine, Feb. 2000.
Sadot, D. et al., "Tunable Optical Filters for Dense WDM Networks", IEEE Communications Magazine, Dec. 1998.
Dutton, H.J.R., "Understanding Optical Communications", pp. 149-156 and 205-261, Sep. 1998.
Hibino, Y., "An Array of Photonic Filtering Advantages", Circuits and Devices, IEEE, Nov. 2000.
Andre, A.N. et al., "Tunable Transparent and Cost Effective Optical Add-Drop Multiplexer Based on Fiber Bragg Grating for DWDM Networks", TU D1.1, 2001 IEEE Digest of LEOS Summer Topical Meetings, 2001.
Tang, P., "Rapidly Tunable Optical Add-Drop Multiplexer (OADM) Using a Static-Strain-Induced Grating in LiNbO3", Journal of Lightwave Technology, vol. 21, No. 1, Jan. 2003.

* cited by examiner

*Primary Examiner*—Frank G. Font
*Assistant Examiner*—Mary El-Shammaa

(57) ABSTRACT

A flexible waveband deaggregator/aggregator design is disclosed, including an embodiment that utilizes flexible band tunable filters and an embodiment that utilizes tunable interleavers. An optical cross-connect design is also disclosed which utilizes the flexible waveband deaggregators and which can replace a core all-optical switch with a fiber interconnect matrix.

20 Claims, 11 Drawing Sheets

(A)

(B)

FLEXIBLE WAVEBAND AGGREGATOR AND DEAGGREGATOR AND HIERARCHICAL HYBRID OPTICAL CROSS-CONNECT SYSTEM

CROSS-REFERENCE TO RELATED APPLICATIONS

This application claims the benefit of U.S. Provisional Application No. 60/581,278 filed on Jun. 18, 2004, the contents of which is hereby incorporated by reference.

This application is related to U.S. application Ser. No. 10/810,632, entitled "FLEXIBLE BAND TUNABLE FILTER," filed on Mar. 26, 2004, which is incorporated by reference herein.

BACKGROUND OF THE INVENTION

The invention relates to optical communication, and, more particularly, to optical cross connect (OXC) designs for use in optical networks.

A leading technology for use in next generation high-speed communication networks has been wavelength division multiplexing (WDM) or its variations such as Dense-WDM. See, e.g., M. S. Borella, J. P. Jue, D. Banerjee, et al., "Optical Components for WDM Lightwave Networks," Proceedings of the IEEE, Vol. 85, No. 8, pp. 1274-1307, August 1997, the contents of which are incorporated by reference herein. In a WDM system, multiple signal sources are emitted at different wavelengths and multiplexed onto the same optical medium, each wavelength representing a separate channel. A fundamental building block of a WDM network is the optical cross connect (OXC) which routes input optical signals entering the node to appropriate output ports. A variety of different approaches have been developed for the design of optical cross connects, including optical-electrical-optical (OEO) switches, all-optical (OO) switches and hybrid approaches that serve as a migration path to an all-optical switch.

An advantageous hybrid cross-connect design, referred to as a "hybrid hierarchical" optical cross connect architecture, bundles together groups of wavelengths with a similar switching path, referred to as a "waveband." See co-pending U.S. Utility patent application, Ser. No. 10/100,990, entitled "NON-UNIFORM OPTICAL WAVEBAND AGGREGATOR AND DEAGGREGATOR AND HIERARCHICAL HYBRID OPTICAL CROSS-CONNECT SYSTEM", filed on Mar. 20, 2002, published as 2003/0185565 on Oct. 2, 2003, the contents of which are hereby incorporated by reference herein. The separation of input wavebands and the assignment of each band to the OO or OEO plane is performed by what is referred to as a "waveband deaggregator/aggregator" (WDA). The WDA uses fixed wavelength filters to separate the wavebands and uses small switches to assign each waveband to appropriate planes. Signals can go directly from the WDA into an OEO switch without going through the OO switch first, thereby maximizing each switching plane's usage and increasing the node's switching efficiency.

It is advantageous to further improve the design of the waveband deaggregator/aggregator—in particular, to improve its intelligence, flexibility, and versatility while maintaining low cost and complexity.

SUMMARY OF INVENTION

An optical cross-connect device with an improved waveband deaggregator/aggregator design is disclosed. In accordance with a first embodiment of the invention, the waveband deaggregator comprises a plurality of flexible band tunable filters arranged in series. Each flexible band tunable filter in the series drops a tunable waveband of channels in a received optical signal and passes undropped channels to a next flexible band tunable filter in the series. Each dropped tunable waveband can then be forwarded by the waveband deaggregator to one of the switching planes in an optical cross-connect device. Through coordinated tuning of the flexible band tunable filters, a waveband forwarded by a lower flexible band tunable filter in the series can advantageously include non-contiguous channel groups in a single waveband. Optical switches can also be installed to selectively forward a dropped tunable waveband to one of the switching planes in the optical cross-connect. It is advantageous to utilize m−1 flexible band tunable filters where an optical cross-connect has m output ports, since this provides the capability to easily group all channels going to an output port together.

In accordance with a second embodiment of the invention, the waveband deaggregator comprises a plurality of tunable interleaver arranged in a cascade. Each tunable interleaver in the cascade divides a received optical signal into two sets of channels, each set of channels forwarded to one of two next tunable interleavers in the cascade, depending on how the tunable interleaver is tuned. Since the interleavers are tunable, different permutations of channel groups can be output from the cascade of tunable interleavers, each channel group then forwarded by the waveband deaggregator/aggregator to one of the switching planes in an optical cross-connect. Optical switches can also be installed to selective forward a channel group to one of the switching planes in the optical cross-connect. A complete set of $$\sum_{i=1}^{n-1} 2^i$$

tunable interleavers in a cascade of n can advantageously separate an input signal into $2^n$ channel groups.

In accordance with a third embodiment of the invention, the optical cross-connect architecture does not include an all-optical switch but, rather, includes what the inventors refer to as a fiber interconnect matrix which routes wavebands from the improved waveband deaggregators described above to the various output ports. The switching function, accordingly, has been transferred from the core switch to the waveband deaggregators, thereby improving the cost and reliability of the node. The fiber interconnect matrix, moreover, can integrate advantageous technologies, such as planar lightwave circuit and multi-port frequency multiplexing technologies and optical delay lines. The fiber interconnect matrix can have devices such as couplers and splitters built directly into it, thereby adding capabilities such as multicasting.

These and other advantages of the invention will be apparent to those of ordinary skill in the art by reference to the following detailed description and the accompanying drawings.

DETAILED DESCRIPTION

Figure 1:
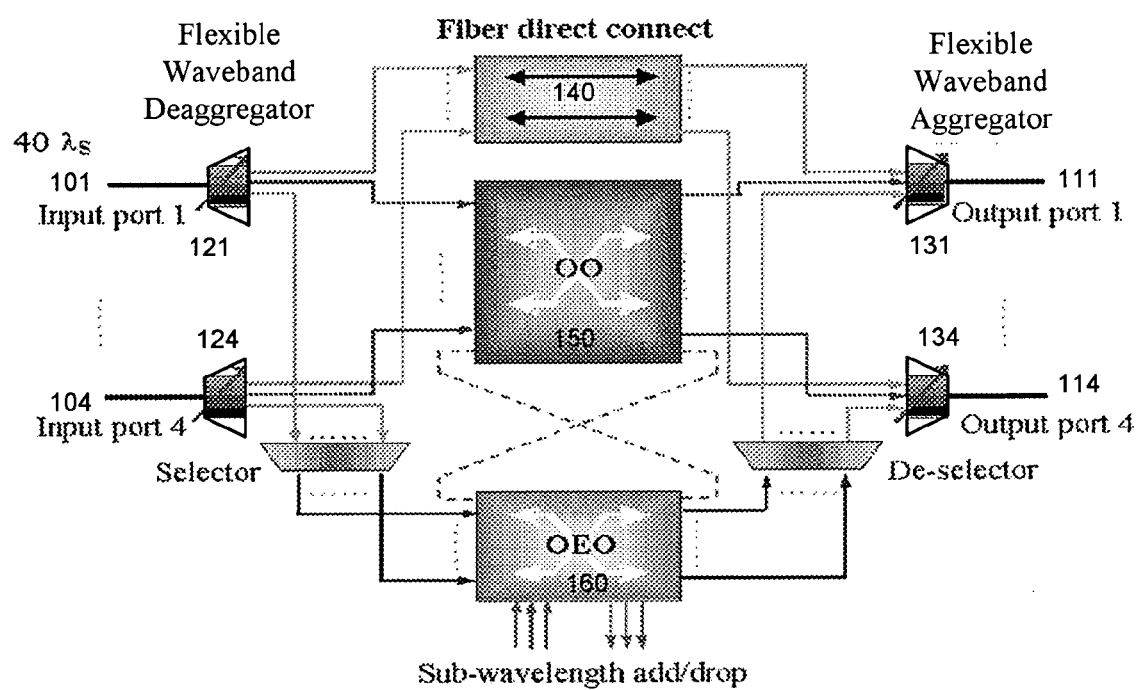
FIG. 1 is a diagram of a hybrid hierarchical optical cross-connect, suitable for implementation of embodiments of the present invention.

FIG. 1 is a diagram of a hybrid hierarchical optical cross-connect (OXC) node 100, suitable for implementation of embodiments of the present invention. The OXC node 100 comprises a number of input ports 101, . . . , 104 and output ports 111, . . . 114. Each port is capable of facilitating the transmission of an optical signal which multiplexes a number of channels, e.g., of different wavelengths where a WDM scheme is utilized. A plurality of waveband deaggregator/aggregators (WDAs) 121, . . . , 124 are used to partition the optical signal into a number of wavebands, each waveband comprising one or more channels (or no channels). The different wavebands, as depicted in FIG. 1, can then be routed to a fiber direct connect (FDC) 140 or to different switching planes, illustratively an all-optical (OO) switch 150 or to an optical-electrical-optical (OEO) switch 160. After processing at one of the switching planes (or after using the FDC plane), a set of couplers or, as depicted in FIG. 1, a set of corresponding WDAs 131, . . . , 134 are used to aggregate the wavebands into optical signals sent to the output ports 111, . . . , 114. The present description is primarily directed to the design of the waveband deaggregators/aggregators 121, . . . , 124, 131, . . . , 134.

Figure 2:
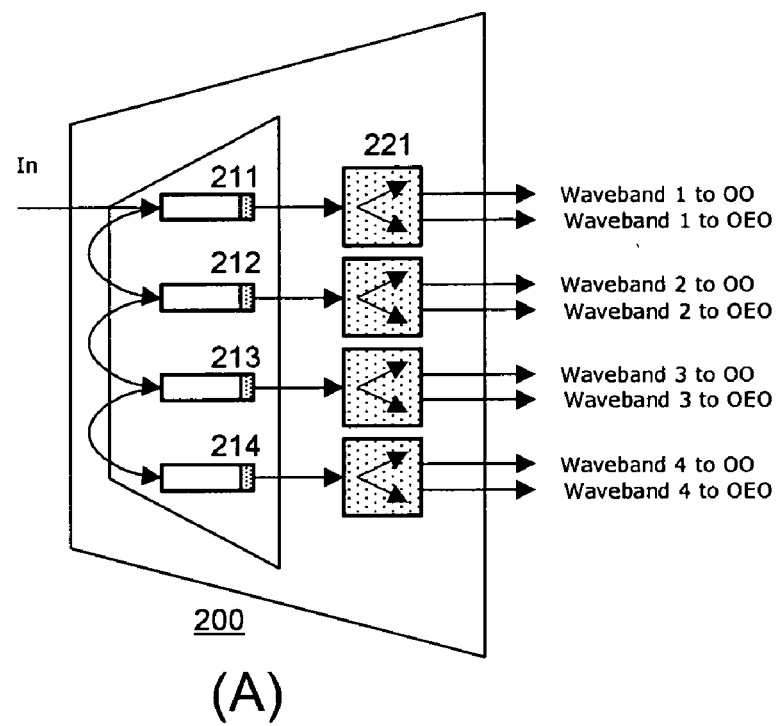
FIGS. 2A and 2B are prior art designs for a waveband deaggregator/aggregator.
Figure 2:
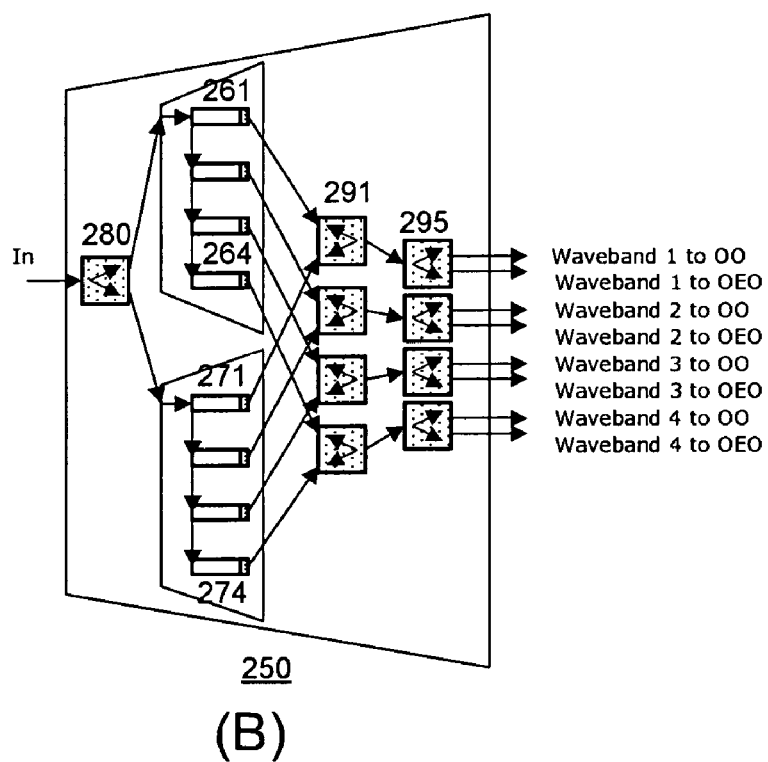

FIGS. 2A and 2B are simplified schematics of prior art waveband deaggregator/aggregator designs. A first generation design is depicted in FIG. 2A, which the inventors refer to as a "fixed" WDA, because it uses a set of fixed filters 211, 212, 213, 214 for waveband separation, and, therefore, can only be used in nodes where the waveband assignment is predetermined. 1×2 optical switches 221 are provided to allow limited configurability. The architecture poses some restrictions on the network traffic pattern, and the throughput of the node might be limited if the traffic pattern changes and the existing waveband separation scheme is no longer appropriate. FIG. 2B shows a "reconfigurable" waveband deaggregator/aggregator 250. Each reconfigurable WDA 250 has more than one set of waveband separators installed inside, so the separation scheme of the de-aggregator becomes reconfigurable. The WDA uses several sets of fixed filters, 261, . . . , 264, 271, . . . , 274, and these sets of filters are predetermined to cater to several types of expected traffic pattern. Optical switches 280 are used to select the appropriate configuration (set of filters) to process the incoming signals at the particular time at the node. An array of 1×2 optical switches 291, . . . 295 can be used to further provide configurability. One of the drawbacks of this approach is the need for more filters for waveband separation and more switches to select which separation scheme to use. Although the reconfigurable WDA provides improved throughput, the improvements are still limited since the waveband separation schemes are still predetermined and cannot be altered after installation.

Figure 3:
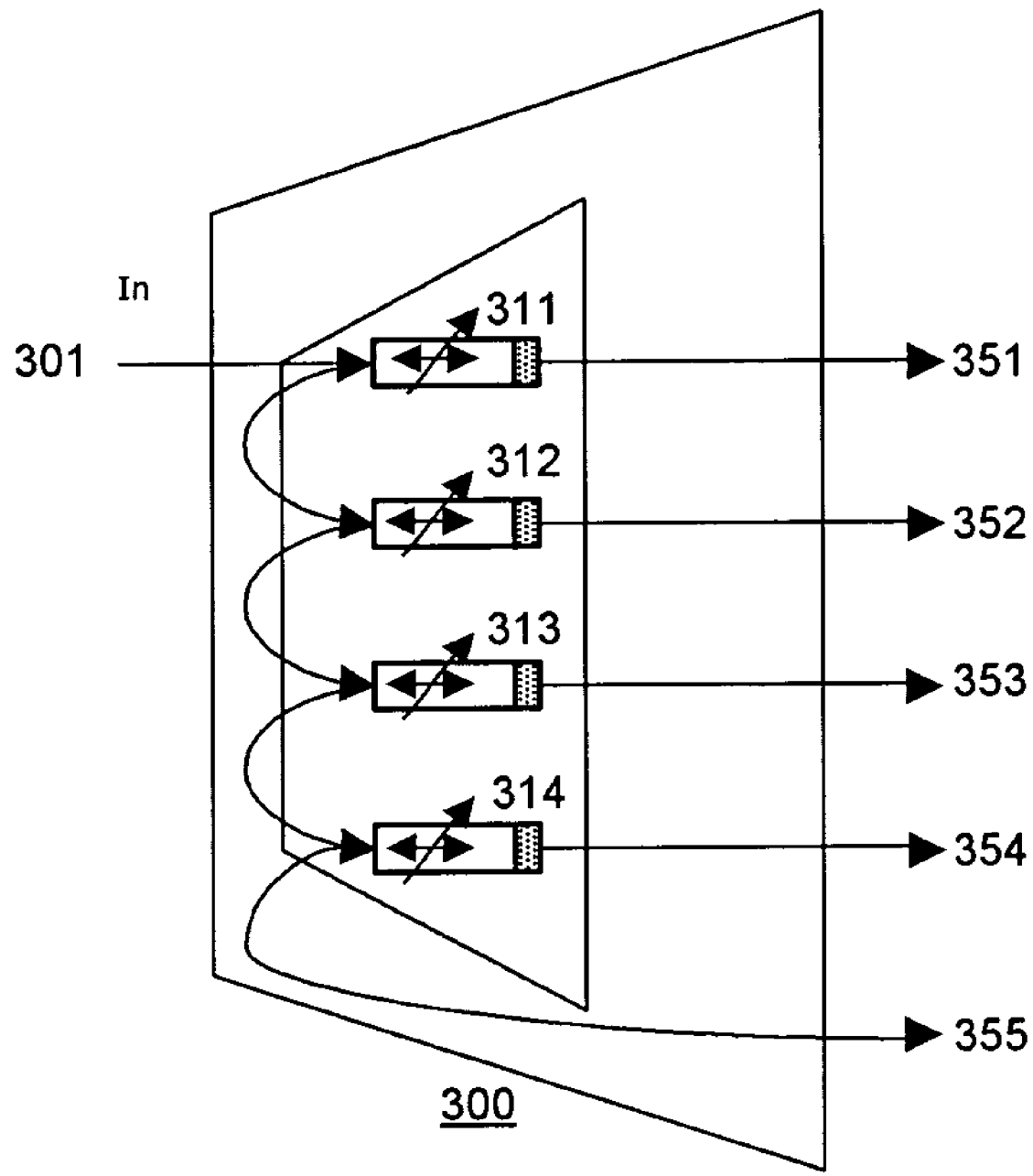
FIG. 3 is a schematic representation of the components of a waveband deaggregator, in accordance with an embodiment of the present invention.
Figure 6A:
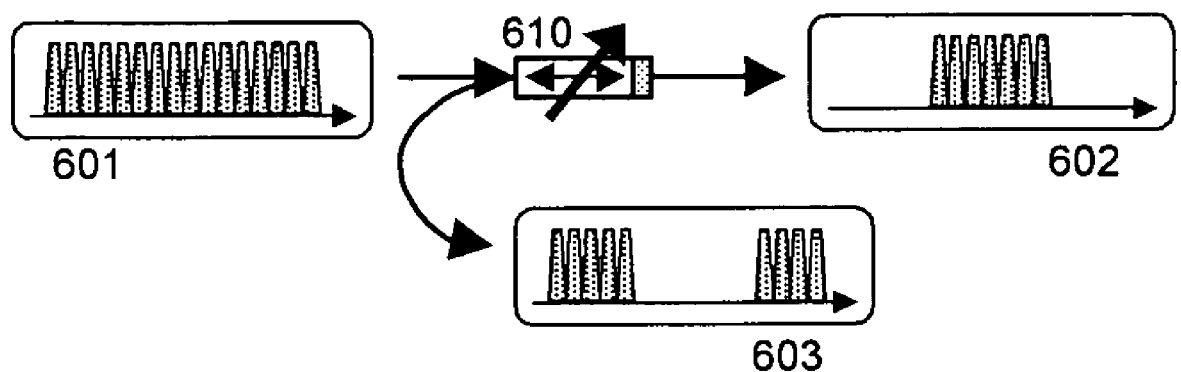
FIG. 6 illustrates the operation of the flexible band tunable filter component of the waveband deaggregator/aggregator.
Figure 6B:
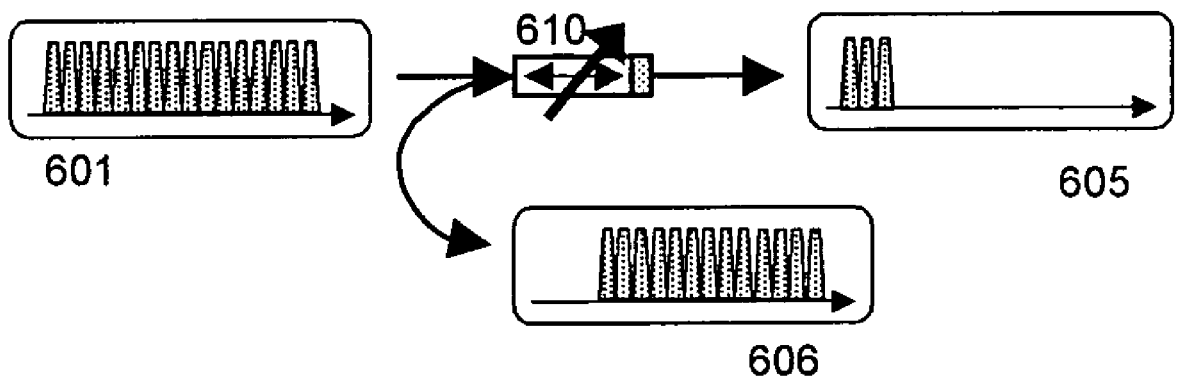

FIG. 3 is a schematic representation of the components of a flexible waveband deaggregator/aggregator 300, in accordance with an embodiment of the present invention. As depicted in FIG. 3, the flexible waveband deaggregator/aggregator 300 comprises a plurality of innovative tunable components which the inventors refer to as flexible band tunable filters ("FBTFs") 311, 312, 313, 314. The design and operation of the flexible band tunable filters is detailed in co-pending commonly-assigned U.S. patent application Ser. No. 10/810,632, entitled "FLEXIBLE BAND TUNABLE FILTER," filed on Mar. 26, 2004, which is incorporated by reference herein. Each flexible band tunable filter comprises a pair of what the inventors refer to as tunable "edge" filters which serve to drop a selective range of channels in the optical signal above or below an edge of their respective passbands. The pair of edge filters serve as the the rising and falling edges of the flexible band tunable filter. The intersection of the passbands of the two tunable edge filters makes up the passband of the flexible band tunable filter. FIG. 6 illustrates the operation of the flexible band tunable filter component. As depicted in FIG. 6A, the flexible band tunable filter 610 is initially tuned to drop seven contiguous channels 602 from the optical signal 601 while the remaining channels 603 are forwarded to the next filter in the series. In FIG. 6B, the flexible band tunable filter 610 is tuned again to drop three contiguous channels 605 from the optical signal 601 while the remaining channels 606 are forwarded to the next filter in the series. Utilizing the flexible band tunable filters, any single channel or multiple of adjacent channels (waveband) can be dynamically selected and filtered out—or it can allow the whole spectrum to be reflected with no optical signal at the transmit port.

As depicted in FIG. 3, the waveband deaggregator/aggregator 300 has a set of flexible band tunable filters 311, 312, 313, 314 arranged in series, each flexible band tunable filter capable of dynamically selecting a particular waveband of channels. The flexible band tunable filters 311, 312, 313, 314 are connected in series. The design advantageously allows non-contiguous channels to be readily grouped into one waveband. Consider an example where network routing requires channels 1 to 4 and channels 9 to 12 to be switched to one output while channels 5 to 8 be switched to another output. Although prior art waveband deaggregator/aggregator designs allow non-uniform wavebands, each waveband was in general restricted to contiguous channels and it was not generally possible to group channels 1-4 and 9-12 into a single waveband. The present design, however, relaxes this restriction significantly. The first flexible band tunable filter 311 in the series can be tuned to drop channels 5-8 while the second flexible band tunable filter 312 in the series can be tuned to drop channels 1-12. Thus, the first flexible band tunable filter 311 will drop channels 5-8 which can be forwarded to the first output. The second flexible band tunable filter 312 receives all of the channels not dropped by flexible band tunable filter 311 and proceeds to drop channels 1-12 from this set of channels. But since channels 5-8 have already been filtered out by the first flexible band tunable filter 311, only channels 1-4 and 9-12 will reach the output of the second flexible band tunable filter 312. This cannot be achieved with a simple series of filters alone. Using the flexible band tunable filters 311, 312, 313, 314, each waveband can include any number of the input channels at any wavelengths. So huge varieties of waveband combination can be set.

It should be noted that although four flexible band tunable filters 311, 312, 313, 314 are depicted in FIG. 3, the design is not so limited. Any number of flexible band tunable filters can be utilized depending on the specific operational needs for the waveband deaggregator/aggregator. Nevertheless, it is advantageous to utilize m−1 flexible band tunable filters where the node has m output ports, since this provides the capability to easily group all channels going to each output port together. Thus, as depicted in FIG. 3, four flexible band tunable filters 311, 312, 313, 314 can produce five tunable wavebands at 351, 352, 353, 354, 355. After grouping the input channels in an optical signal 301 into wavebands, the waveband deaggregator/aggregator 300 sends each waveband of dropped channels to one of the planes in the hierarchical optical cross-connect. An important consideration in constructing the waveband deaggregator/aggregator is evaluating the optical performance of the signals at the output. Since the flexible band tunable filters 311, 312, 313, 314 are connected in series, the optical loss experienced by the signals at filters lower in the series could be higher than those channels exiting the filters at the upper portion of the series. Thus, appropriate optical power management is desirable in such situations where a large number of flexible band tunable filters are utilized. Variable optical attenuators (VOAs) can be used to address the issue.

Figure 4:
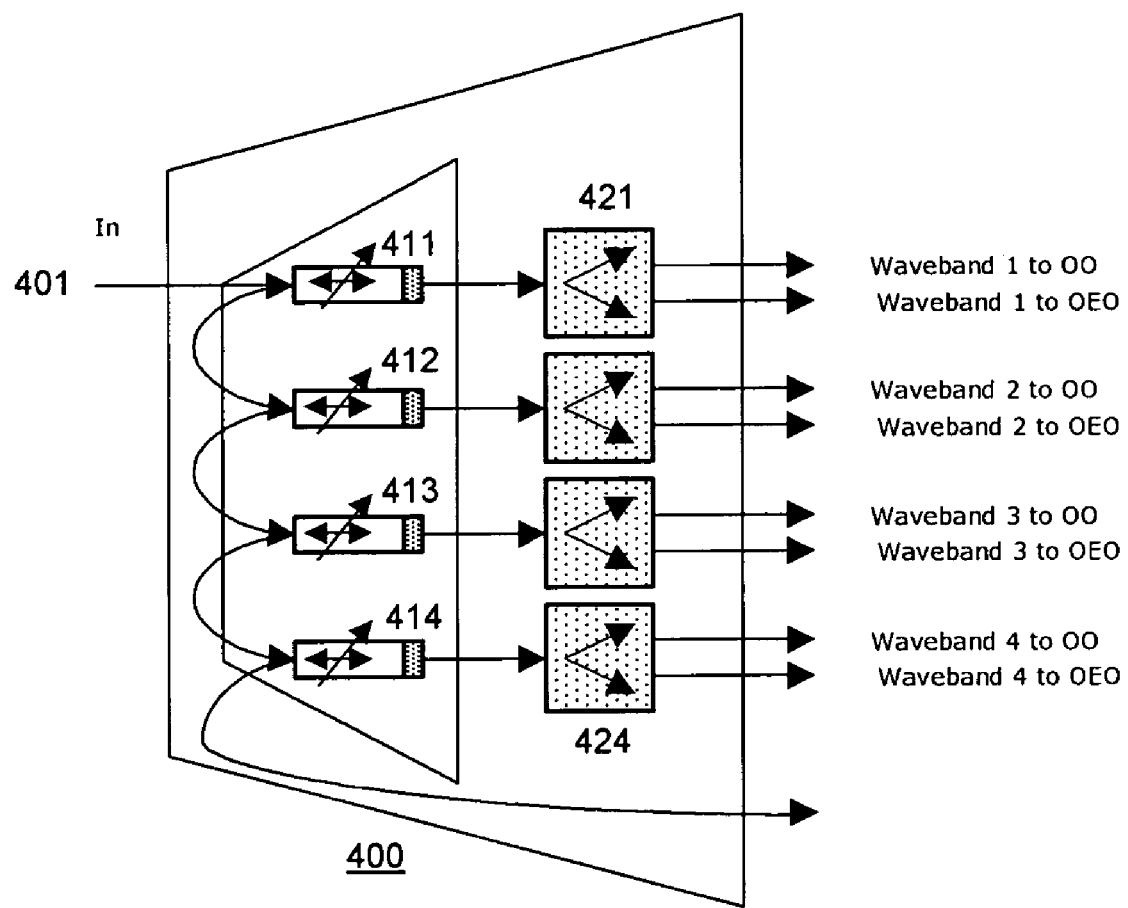
FIGS. 4 and 5 are a schematic representations of the components of a waveband deaggregator, in accordance with different embodiments of the present invention.
Figure 5:
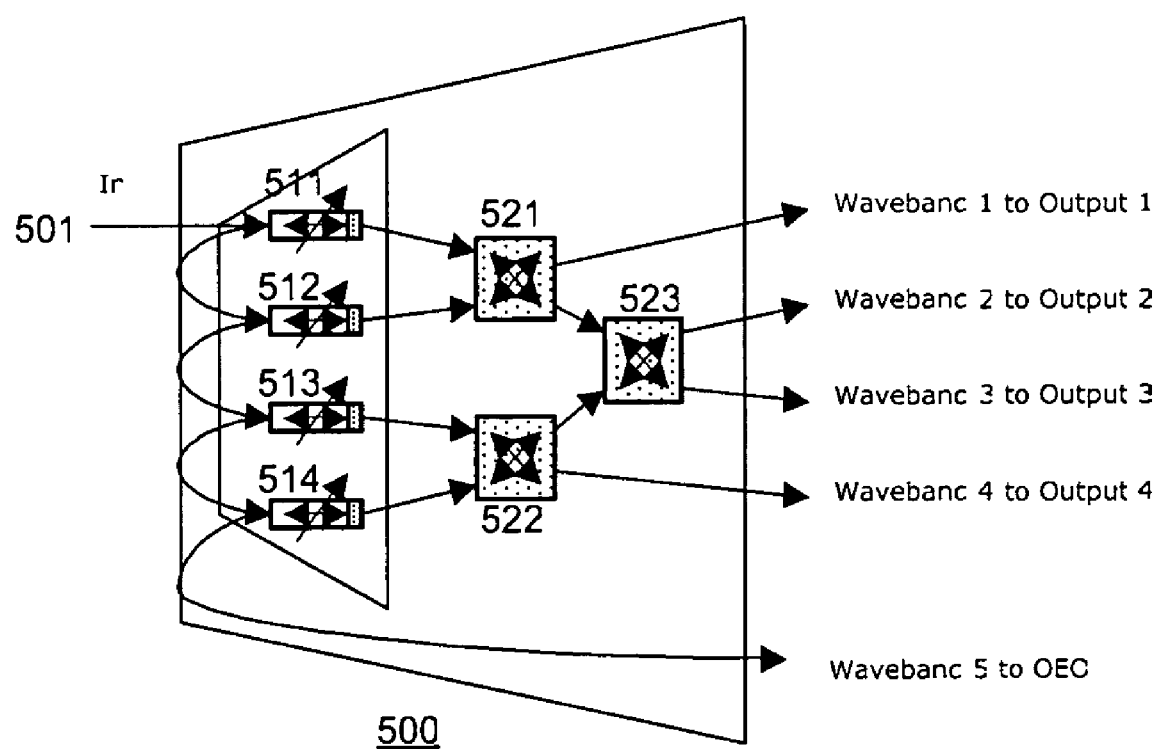

FIGS. 4 and 5 depict alternative embodiments which provide additional flexibility with regards to which plane a waveband output is forwarded. As depicted in FIG. 4, 1×2 optical switches 421, . . . , 424 can be provided to allow a dropped waveband to be selectively forwarded to one of two different planes in the hierarchical optical cross-connect.

FIG. 5 sets forth an alternative embodiment which does not use 1×2 optical switches. Rather, the waveband deaggregator/aggregator 500 advantageously provides a few 2×2 optical switches 521, 522, 523 in combination with the series of flexible band tunable filters 511, 512, 513, 514. These 2×2 switches 521, 522, 523 serve to significantly expand the capability of having non-contiguous channels within a single waveband. As depicted in FIG. 5, the waveband selected at the xth flexible band tunable filter in the series can go to yth output port and x≠y, depending on the settings of the 2×2 switches. The residual channels remaining after the last flexible band tunable filter 514 in the series can be designated for a specific plane in the hierarchical optical cross-connect, illustratively the OEO switching plane as shown in FIG. 5. In the case that none of the channels require OEO operation, all the input channels can be filtered by the flexible band tunable filters 511, 512, 513, 514 and leave the OEO path empty. Unlike the prior art designs with their arrays of 1×2 switches, the embodiment shown in FIG. 5 provides more flexibility in waveband selection.

The flexibility of the disclosed waveband deaggregator/aggregator design advantageously allows it to take over some of the switching function of the core optical switch. Note that in prior art designs, there is no indication in terms of which output destination each waveband will be switched to (except wavebands going into the FDC since they do not require any switching) and the switching is controlled and realized by the OO and OEO plane. With the flexible waveband deaggregator/aggregator design, the output destination for each waveband can already be determined at the device internally. Moreover, since all channels going to a particular plane, such as the OEO plane, in any given input fiber can be grouped together by the flexible waveband deaggregator/aggregator, only one waveband per fiber need go to the OEO switch, which reduces the number of input ports needed for the selector significantly.

The flexible waveband deggregator/aggregator is also more intelligent than prior art WDA designs. The wavebands can be selected dynamically, according to the changes in traffic needs at the node. This enables real time reconfiguration of waveband separation schemes. It can handle almost all traffic patterns and is not limited to a few pre-determined configurations. Most foreseeable waveband separation scenarios can be readily achieved. The number of waveband separation schemes that can be handled is basically limitless. The flexibility will maximize the optical cross-connect node throughput, particularly in the networks where traffic patterns changes constantly. Moreover, the waveband deaggregator/aggregator design disclosed, herein provides more flexibility and intelligence while reducing the number of filters and optical switches needed in prior art reconfigurable designs.

Figure 7:
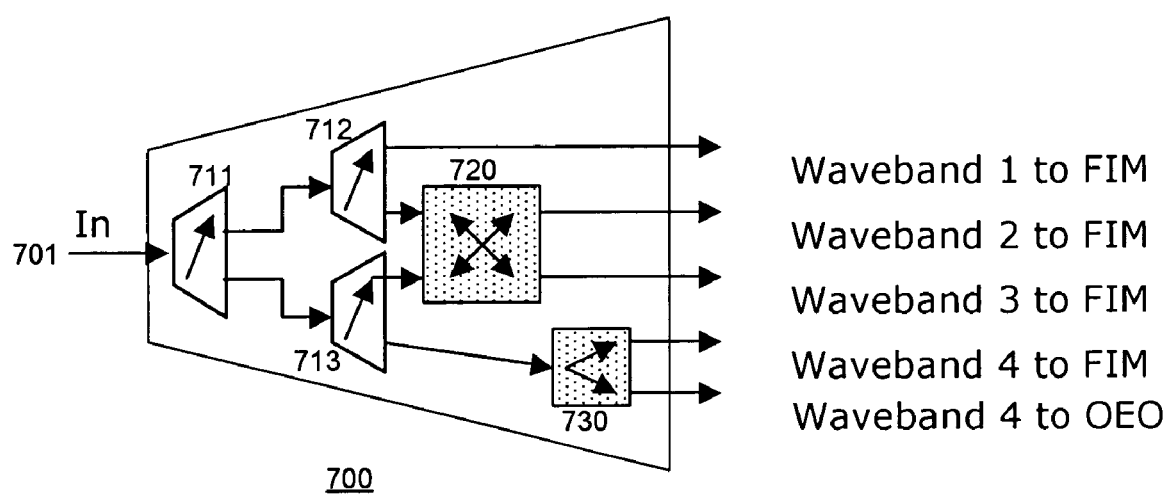
FIG. 7 is a schematic representation of the components of a waveband deaggregator/aggregator, in accordance with another embodiment of the present invention.

FIG. 7 is a schematic representation of the components of another design for the flexible waveband deaggregator/aggregator 700, in accordance with another embodiment of the present invention. This embodiment uses a different waveband separation mechanism than the above-described WDA designs. As depicted in FIG. 7, this design for the flexible waveband deaggregator/aggregator 700 comprises a plurality of innovative tunable components which the inventors refer to as "tunable interleavers" 711, 712, 713. The design and operation of the tunable interleavers is further detailed in co-pending commonly-assigned U.S. patent application Ser.No. 10/810,632, filed on Mar. 26, 2004, which is incorporated by reference herein. The tunable interleaver can be constructed, for example and as disclosed therein, by using thermal tuning technology.

Figure 8A:
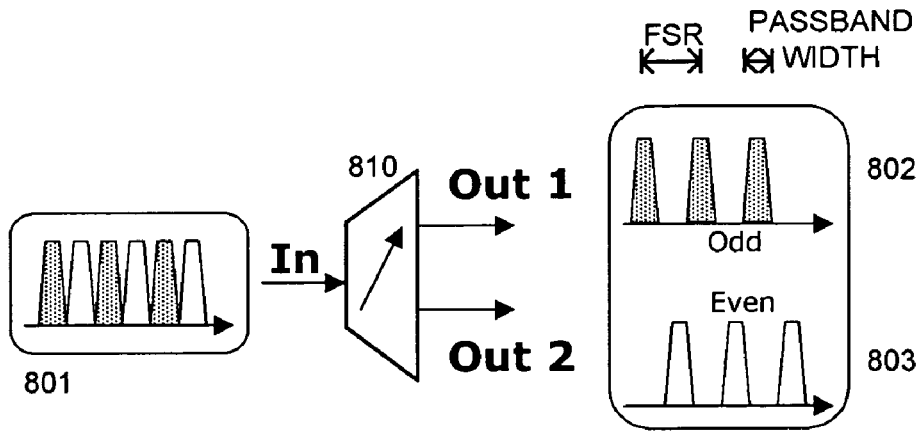
FIG. 8 illustrates the operation of the tunable interleaver component of the waveband deaggregator/aggregator.
Figure 8B:
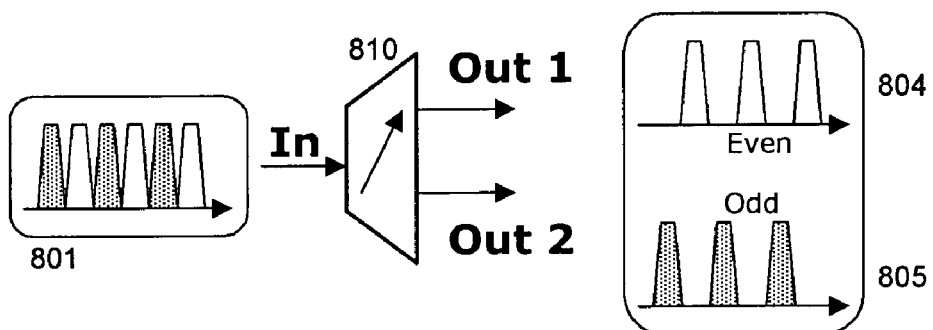
Figure 8C:
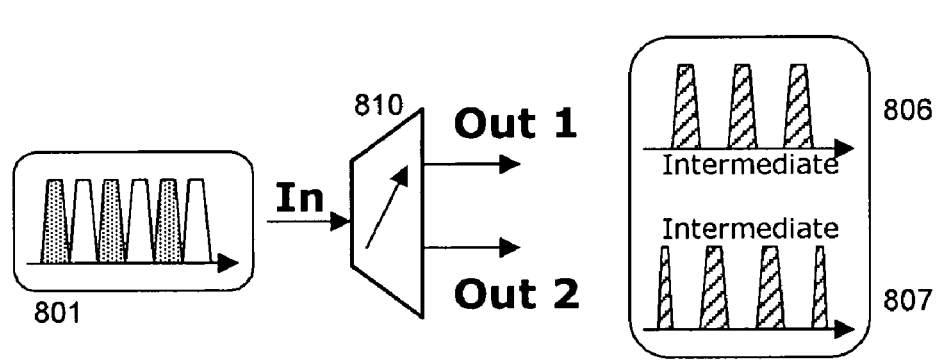

FIG. 8 illustrates the operation of the tunable interleaver. An interleaver in general is a passive optical device with a comb-like filter, and is able to separate an input optical signal 801 into two outputs 802, 803, each having equally spaced channels. The spectral spacing between the centers of the two adjacent passbands (called the "free spectral range" or "FSR") at the output is the double of the spectral width of each passband, and is typically set to values such as 50 GHz, 100 GHz, 200 GHz or other values. Unlike prior art interleavers with output spectra that are fixed at manufacture, the tunable interleaver 810 adds spectral tuning capability to the device. In the tunable interleaver 810, each of the two outputs still process half of the spectral in an alternative manner, and the width of each passband (lobe) preferably does not change during the tuning process (unlike the flexible band tunable filter, whose passband width can be varied by tuning). The spectral dividing positions between these two outputs, however, can be tuned continuously, as depicted in FIGS. 8A, 8B, and 8C. The tuning range is preferably over one full period, that is, greater than the FSR of the interleaver. The dividing wavelengths (and thus, dividing frequencies) between the two outputs are no longer limited to fixed values (for example as specified by ITU-T standards), and instead can be changed to practically any value. At certain tuning positions, the two outputs of the tunable interleaver 810 can be switched completely, as depicted in FIGS. 8A and 8B. Therefore, any certain output port can contain all the even channels, or all the odd channels, or any intermediate channels, while the other output port has the complement of spectrum. The tunable interleaver, thus, can be used to separate odd channels from even channels at different channel spacings, such as 50 GHz, 100 GHz, 200 GHz, 400 GHz, etc.

Figure 9:
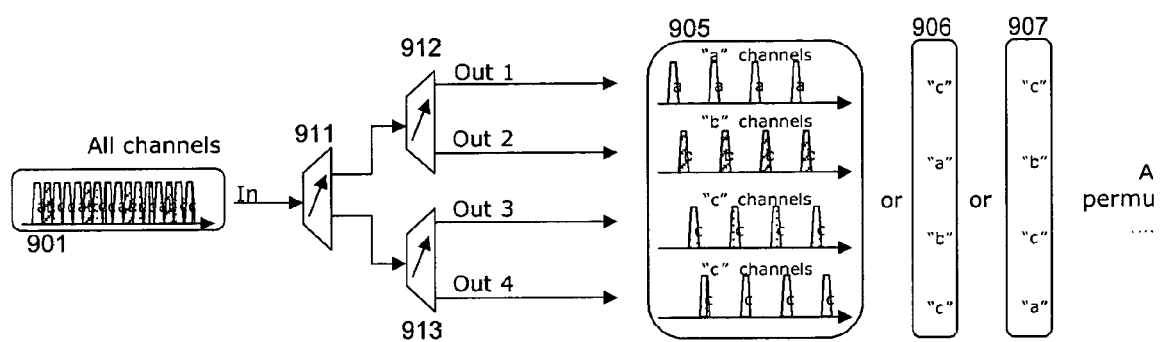
FIG. 9 illustrates the waveband separation performed by the embodiment shown in FIG. 6.

With reference again to FIG. 7, the tunable interleavers 711, 712, 713 in the flexible waveband deaggregator/aggregator design are connected in cascade. By connecting the tunable interleavers with different free spectral range (FSR) values in cascade, different permutations of waveband separation can be achieved. FIG. 9 illustrates the waveband separation operation performed by the tunable interleavers. Tunable interleaver 911 is spectrally tuned so that it divides the optical signal into a passband that includes both channels "a" and "b" in a first output and that includes channels "c" and "d" in a second output. Tunable interleaver 912 receives the first output from tunable interleaver 911 and is spectrally tuned so that it divides the optical signal into channels "a" and "b" at its respective outputs, as depicted in FIG. 9. Similarly, tunable interleaver 913 receives the second output from tunable interleaver 911 and is spectrally tuned so that it divides the optical signal into channels "c" and "d" at its respective outputs. Moreover, the tunable interleavers 911, 912, 913 can be readily tuned to change the channels output, as depicted in FIG. 9. Three tunable interleavers are illustratively depicted in FIG. 7 and FIG. 9, although the invention is not so limited. A complete set of tunable interleavers with a cascade of n implies that there are $$\sum_{i=1}^{n-1} 2^i$$

tunable interleavers, and such an arrangement of tunable interleavers can separate the input signals into $2^n$ wavebands.

As depicted in FIG. 7, it can be advantageous to provide 2×2 switches 720 and/or 1×2 switches 730 to additionally provide the quick ability to selectively forward an optical signal to different planes in the hierarchical optical cross-connect.

It should be noted that the wavebands obtained by this embodiment have very different characteristics compared to those from the other embodiment described above. In the structure depicted in FIG. 7, each of the separated wavebands have the same number of channels, and, therefore, they are uniform wavebands (non-uniform wavebands if desired can be obtained by adding filters), and the channels in each waveband are not contiguous. They are equally spaced in the channel spectrum. The distance between adjacent channels is determined by the number of levels in the cascade and the free spectral range of the interleavers. Thus, the flexible waveband deaggregator/aggregator design which uses flexible band tunable filters offers greater flexibility in waveband separation, because the tunable interleaver-based flexible waveband deaggregator/aggregator separates input channels into equal size wavebands. So, when a channel is required to be switched to the OEO plane, all the other channels in the waveband need be switched together. The tunable interleaver-based flexible WDA, however, also has its advantages. For example, for a same size flexible WDA, the amount of 2×2 switches required by the tunable interleaver-based flexible WDA should be smaller than those required by the flexible band tunable filter-based flexible WDA. Moreover, if the flexible band tunable filter components of a flexible WDA use mechanical tuning, this can be disadvantageous compared to tunable interleavers which can be implemented without moving parts, such as by using thermal tuning. Due to the different characteristics of the waveband separated by these two approaches, different network level wavelength assignment schemes could be required.

Figure 10:
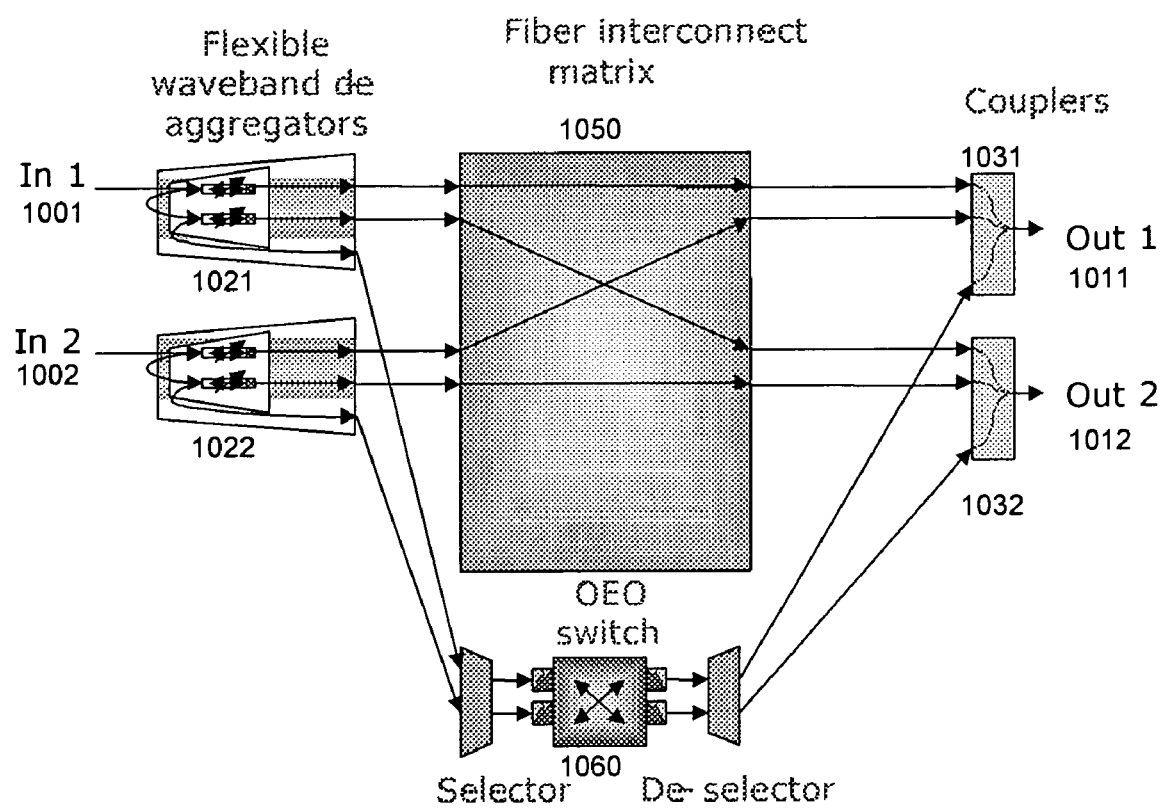
FIG. 10 is a diagram of a hierarchical optical cross-connect design, in accordance with another embodiment of another aspect of the present invention.
Figure 11:
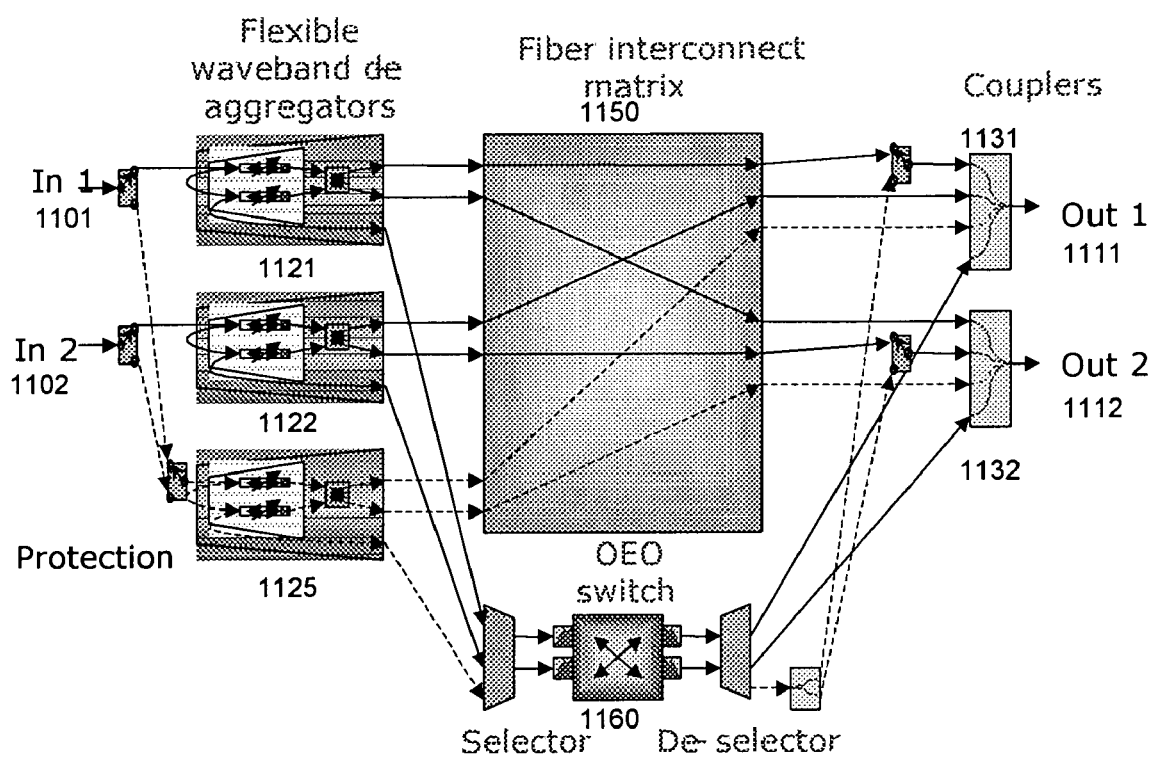
FIG. 11 illustrates how to implement shared protection in the design of FIG. 10.

As mentioned above, the capabilities of the disclosed waveband deaggregator/aggregator designs advantageously allow it to take over the switching function of the core optical switch. FIGS. 10 and 11 illustrate an optical cross-connect architecture that further takes advantage of these capabilities.

In FIG. 10, the optical cross-connect comprises a plurality of flexible waveband deaggregators 1021, 1022, implemented as disclosed above. The flexible waveband deaggregators 1021, 1022 are depicted as being constructed with flexible band tunable filters in FIG. 10, although they can also readily be constructed using tunable interleavers as discussed above. The flexible waveband deaggregators 1021, 1022 receive optical signals at the input ports 1001, 1002, respectively, and can tunably select wavebands out of the optical signals and direct the wavebands to either of the output ports 1011, 1012 or to an OEO switch 1060. Note that the optical cross-connect depicted in FIG. 10 does not have an all-optical switch. Recall the OO plane 150 and the FDC plane 140 depicted in FIG. 1 discussed above. In FIG. 10, the proposed static core OO plane is integrated with the FDC plane to form a new plane which the inventors refer to as a "fiber interconnect matrix" (FIM) 1050. The fiber interconnect matrix 1050 provides an optical path connecting the flexible waveband deaggregators 1021, 1022 with the outputs of the optical cross-connect 1011, 1012. The different wavebands routed to the same output can be aggregated, for example and as depicted in FIG. 10, by couplers 1031, 1032. Note that although the optical cross-connect depicted in FIG. 10 provides 2×2 operation, the design is clearly not so limited and can encompass any number of input/output ports and flexible band deggregators.

The fiber interconnect matrix 1050, unlike a traditional fiber direct connect plane, can take advantage of a range of advantageous technologies. For example, the fiber interconnect matrix can take advantage of planar lightwave circuit (PLC) technology as well as multi-port frequency multiplexing technology. These technologies can compress large numbers of optical paths into a small footprint. Also, a fiber interconnect matrix can have devices such as couplers and splitters built directly into it, thereby adding capabilities such as multicasting to the transparent part of the optical cross-connect node. Components such as fiber delay lines (FDLs, sometimes referred to in the art as optical delay lines or ODLs) can also be integrated into the fiber interconnect matrix plane, thereby expanding the control functionality of the fiber interconnect matrix to the time domain.

The switching functions have been transferred to the flexible waveband deaggregators 1021, 1022, so that the core section of the optical cross-connect can be static. The architecture spreads out the switching loading so large scale switches are no longer required. It also reduce the component quantity by integrating filtering and switching together, thereby resulting in an optical cross-connect node with a lower cost and better reliability. The architecture depicted in FIG. 10 advantageously foregoes the need for a large-scale core all-optical switch, which in the current market are mostly based on MEMS technology. It is well known in the optical component field that MEMS technology is still not very mature, particularly for large-scale 2D and 3D MEMS products. The disadvantages of large-scale MEMS switches include vulnerability to physical vibration, humidity, fatigue, poor port-to-port repeatability and uniformity, and relatively slow switching speed and high price.

In FIG. 11, an optical cross-connect design is depicted which demonstrates how the capability to share protection can be implemented. An extra flexible waveband deaggregator 1125 and various switches are provided which facilitate an extra path for protection purposes, shown in FIG. 11 in dotted lines.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. An optical cross-connect device comprising:
   one or more planes;
   one or more waveband deaggregators, each waveband deaggregator further comprising a plurality of flexible band tunable filters connected in series, each flexible band tunable filter in the series dropping a tunable waveband of channels in a received optical signal and passing undropped channels to a next flexible band tunable filter in the series, each dropped tunable waveband capable of being forwarded to one of the planes, whereby, non-contiguous channel groups can be forwarded to one of the planes in a single waveband.

2. The optical cross-connect device of claim 1 wherein the waveband deaggregator further comprise one or more optical switches, the optical switches used to selectively forward the dropped waveband to one of the planes.

3. The optical cross-connect device of claim 2 wherein the optical switches are 1×2 optical switches.

4. The optical cross-connect device of claim 2 wherein the optical switches are 2×2 optical switches arranged in an array.

5. The optical cross-connect device of claim 1 wherein variable optical attenuators are installed in the series of flexible band tunable filters.

6. The optical cross-connect device of claim 1 wherein one of the planes is an all-optical switch.

7. The optical cross-connect device of claim 1 wherein one of the planes is an OEO switch.

8. The optical cross-connect device of claim 1 wherein one of the planes is a fiber direct connect.

9. The optical cross-connect device of claim 1 wherein one of the planes is a fiber interconnect matrix.

10. An optical cross-connect device comprising:
    one or more planes;
    one or more waveband deaggregators, each waveband deaggregator further comprising a cascade of tunable interleavers, each tunable interleaver in the cascade dividing a received optical signal into two sets of channels, each set of channels forwarded to a next tunable interleaver in the cascade, thereby outputting a plurality of channel groups, each channel group forwarded to one of the planes.

11. The optical cross-connect device of claim 10 wherein the waveband deaggregator further comprise one or more optical switches, the optical switches used to selectively forward the channel group to one of the switching planes.

12. The optical cross-connect device of claim 10 wherein one of the planes is an all-optical switch.

13. The optical cross-connect device of claim 10 wherein one of the planes is an OEO switch.

14. The optical cross-connect device of claim 10 wherein one of the planes is a fiber direct connect.

15. The optical cross-connect device of claim 10 wherein one of the planes is a fiber interconnect matrix.

16. An optical cross-connect device comprising:
    a fiber interconnect matrix;
    one or more flexible waveband deaggregators, each flexible waveband deaggregator partitioning an input optical signal into a plurality of tunable wavebands, each tunable waveband forwarded by the flexible waveband deaggregator through the fiber interconnect matrix to one of a plurality of output ports.

17. The optical cross-connect device of claim 16 wherein the flexible waveband deaggregators are constructed from a series of flexible band tunable filters.

18. The optical cross-connect device of claim 16 wherein the flexible waveband deaggregators are constructed from a cascade tunable interleavers.

19. The optical cross-connect device of claim 16 further comprising an OEO switch wherein the flexible waveband deaggregator forwards one of the tunable wavebands to the OEO switch.

20. The optical cross-connect device of claim 16 wherein the fiber interconnect matrix provides multicasting on at least one waveband path through the fiber interconnect matrix.

* * * * *